(12) United States Patent
Barclay et al.

(10) Patent No.: US 10,513,104 B2
(45) Date of Patent: Dec. 24, 2019

(54) 3D PRINTER WITH COUPLING FOR ATTACHING PRINT HEAD TO HEAD CARRIAGE

(71) Applicant: Stratasys, Inc., Eden Prairie, MN (US)

(72) Inventors: Aaron Barclay, Prior Lake, MN (US); Peter D. Schuller, Elko, MN (US); Jordan Paul Nadeau, St. Louis Park, MN (US); Shawn Michael Koop, Blaine, MN (US)

(73) Assignee: STRATASYS, INC., Eden Prarie, MN (US)

( * ) Notice: Subject to any disclaimer, the term of this patent is extended or adjusted under 35 U.S.C. 154(b) by 485 days.

(21) Appl. No.: 15/237,128

(22) Filed: Aug. 15, 2016

(65) Prior Publication Data

US 2018/0043627 A1 Feb. 15, 2018

(51) Int. Cl.
*B29C 64/118* (2017.01)
*B29C 64/209* (2017.01)
(Continued)

(52) U.S. Cl.
CPC .......... *B33Y 30/00* (2014.12); *B29C 64/118* (2017.08); *B29C 64/209* (2017.08); *B33Y 40/00* (2014.12)

(58) Field of Classification Search
None
See application file for complete search history.

(56) References Cited

U.S. PATENT DOCUMENTS 3,944,041 A * 3/1976 Mueller .............. B41J 1/04
400/463
4,314,736 A * 2/1982 Demnianiuk .......... H01R 12/89
439/264
(Continued)

FOREIGN PATENT DOCUMENTS

WO 2016014543 A1 1/2016

*Primary Examiner* — Jacob T Minskey
*Assistant Examiner* — Baileigh Kate Darnell
(74) *Attorney, Agent, or Firm* — Westman, Champlin & Koehler, P.A.

(57) ABSTRACT

An 3D printer has a gantry configured to move in a plane substantially parallel to a build plane. The system includes a platen configured to support a part being built in a layer by layer process, wherein the platen is configured to move in a direction substantially normal to the build plane. The system includes a head carriage carried by the gantry wherein the head carriage includes a first support member supporting a retaining mechanism. The retaining mechanism includes at least one member extending from the support member and a camming member rotatably attached to the support member and movable about an axis of rotation. The camming member has arcuate camming surface with an increasing radial distance from the axis of rotation. The system includes at least one print head having a housing with a first side surface configured to engage the at least one member and a second side surface configured to engage the arcuate camming surface. The camming member is positionable between a first, non-engaging position where the at least one print head is removable from the support member and a second, engaging position wherein the camming member engages the second side of the print head and the first side of the print head engages the at least one member and causes a frictional engagement therebetween.

22 Claims, 8 Drawing Sheets

(51) Int. Cl.
*B33Y 30/00* (2015.01)
*B33Y 40/00* (2015.01)

(56) References Cited

U.S. PATENT DOCUMENTS

| | | |
|---|---|---|
| 6,004,124 A | 12/1999 | Swanson et al. |
| 6,722,872 B1 | 4/2004 | Swanson et al. |
| 7,063,285 B1 | 6/2006 | Turley et al. |
| 7,604,470 B2 | 10/2009 | LaBossiere et al. |
| 7,625,200 B2 | 12/2009 | Leavitt |
| 7,938,356 B2 | 5/2011 | Taatjes et al. |
| 8,403,658 B2 | 3/2013 | Swanson |
| 8,439,665 B2 | 5/2013 | Batchelder et al. |
| 8,647,102 B2 * | 2/2014 | Swanson ............ B29C 67/0055 425/162 |
| 8,926,484 B1 * | 1/2015 | Comb .................... B23Q 3/155 425/162 |
| 8,985,497 B2 | 3/2015 | Mannella et al. |
| 9,073,263 B2 | 7/2015 | Mannella et al. |
| 9,108,360 B2 | 8/2015 | Comb et al. |
| 9,168,685 B2 * | 10/2015 | Swanson ............ B29C 67/0055 |
| 9,469,071 B2 * | 10/2016 | Douglass ............ B29C 67/0055 |
| 2009/0035405 A1 * | 2/2009 | Leavitt ................ B29C 47/0021 425/97 |
| 2010/0100224 A1 * | 4/2010 | Comb .................... B33Y 40/00 700/118 |
| 2012/0161350 A1 * | 6/2012 | Swanson ............ B29C 67/0055 264/40.7 |
| 2012/0162314 A1 * | 6/2012 | Swanson ............ B29C 67/0055 347/37 |
| 2012/0164256 A1 * | 6/2012 | Swanson ............ B29C 67/0055 425/162 |
| 2012/0164330 A1 * | 6/2012 | Swanson ............ B29C 67/0055 427/258 |
| 2013/0161439 A1 * | 6/2013 | Beery ................ B65H 49/322 242/396.1 |
| 2014/0120194 A1 * | 5/2014 | Swanson ............ B29C 67/0055 425/150 |
| 2015/0096717 A1 | 4/2015 | Batchelder et al. |
| 2015/0097053 A1 | 4/2015 | Batchelder et al. |
| 2016/0039146 A1 * | 2/2016 | Swanson ............ B29C 67/0055 425/375 |

* cited by examiner

3D PRINTER WITH COUPLING FOR ATTACHING PRINT HEAD TO HEAD CARRIAGE

BACKGROUND

The present disclosure relates to additive manufacturing systems for printing three-dimensional (3D) parts and support structures. In particular, the present disclosure relates to a coupling for attaching and detaching a print head to and from a head carriage in an 3D printer.

Additive manufacturing, also called 3D printing, is generally a process in which a three-dimensional (3D) object is built by adding material to form a 3D part rather than subtracting material as in traditional machining. One basic operation of an additive manufacturing system consists of slicing a three-dimensional computer model into thin cross sections, translating the result into two-dimensional position data, and feeding the data to control equipment which manufacture a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes. Using one or more additive manufacturing techniques, a three-dimensional solid object of virtually any shape can be printed from a digital model of the object by an additive manufacturing system, commonly referred to as 3D printer.

In a fused deposition modeling additive manufacturing system, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a typical system where the material is deposited in planar layers, the position of the print head relative to the substrate is incremented along an axis (perpendicular to the build plane) after each layer is formed, and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

An aspect of the present disclosure relates to a 3D printer having a gantry configured to move in a plane substantially parallel to a build plane. The system includes a platen configured to support a part being built in a layer by layer process, wherein the platen is configured to move in a direction substantially normal to the build plane. The system includes a head carriage carried by the gantry wherein the head carriage includes a support member carrying a retaining mechanism configured to receive a removable print head. The retaining mechanism includes at least one member extending from the support member and a camming member rotatably attached to the support member and movable about an axis of rotation. The camming member has an arcuate camming surface with an increasing radial distance from the axis of rotation. The camming member is positionable between a first, non-engaging position where a received print head is removable from the support member and a second, engaging position wherein the camming member engages the second side surface of the received print head and the first side surface of the received print head engages the at least one member and causes a frictional engagement therebetween.

Another aspect of the present disclosure relates to a 3D printer having a gantry configured to move in a plane substantially parallel to a build plane. The system includes a platen configured to support a part being built in a layer by layer process, wherein the platen is configured to move in a direction substantially normal to the build plane. The system includes a head carriage carried by the gantry wherein the head carriage has a first support member carrying a first retaining mechanism. The first retaining mechanism includes a first pin extending from the support member and a second pin extending from the support member wherein the second pin is spaced from the first pin. The first retaining mechanism includes a camming member rotatably attached to the support member between the first pin and the second pin and laterally offset from the first and second pins, wherein the camming member movable about an axis of rotation. The camming member comprising an arcuate camming surface having an increasing radial distance from the axis of rotation. The system includes at least one print head with a housing having a first side surface configured to engage the first pin and the second pin and a second side surface configured to engage the arcuate camming surface. The camming member is positionable between a first, non-engaging position where the at least one print head is removable from the support member and a second, engaging position wherein the camming member engages the second side of the print head and the first side of the print head engages the first and second pins and results a frictional engagement therebetween.

The 3D printer may include a second support member carrying a second retaining system that is substantially a mirror image of the first retaining system. The system may include a second print head that substantially the same configuration as the first print head where the first and second print heads may include securing features on the first and second sides such that the first and second print heads can be secured to the head carriage with either the first or second retaining systems.

DEFINITIONS

Unless otherwise specified, the following terms as used herein have the meanings provided below.

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In some of the embodiments shown below, the layer-printing direction is along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The terms "about" and "substantially" are used herein with respect to measurable values and ranges due to expected variations known to those skilled in the art (e.g., limitations and variabilities in measurements).

All patents, publications or other documents mentioned herein are incorporated by reference.

DETAILED DESCRIPTION

The present disclosure relates to a mechanism for mounting a print head on a head carriage carried by a gantry of an additive manufacturing system, commonly referred to as a 3D printer. The present disclosure includes a head carriage that carries left and right retaining systems that frictional secure first and second print heads to the head carriage. The retaining mechanisms frictionally engage the left and right print heads and substantially prevent movement of the print heads in the x, y, and z planes, pitch, roll and yaw relative to the head carriage.

The present disclosure provides many advantages over receptacle based retaining systems that utilized a physical interference fit to mount the print head to the carriage. The present disclosure provides a simpler design that leads to more reliability. Further, because the complexity is lessened there are less components and no precision components relative to the prior receptacle based designs, resulting in a more reliable interface between the print head and the head carriage.

Further, the present disclosure allows close placement of the print heads, and therefore a more compact head configuration and smaller overall printer footprint. In the prior art receptacle based retaining systems, when two print heads are positioned side to side, adjacent side walls of the receptacles displace the print heads from each other at least a distance of a thickness of the two adjacent side walls. Beneficially, the present disclosure allows for multiple print heads to be positioned close to each other, or side by side, because a receptacle is not required to mount the print head to the head carriage. Otherwise stated, a packing density of the print heads utilizing the disclosed retaining mechanisms is higher relative to the prior receptacle style designs.

The present disclosed interface between the print head and the carriage can be utilized in any new 3D printer. Further, prior 3D printers can be retrofitted to utilize the disclosed head carriage and print head(s).

Figure 1:
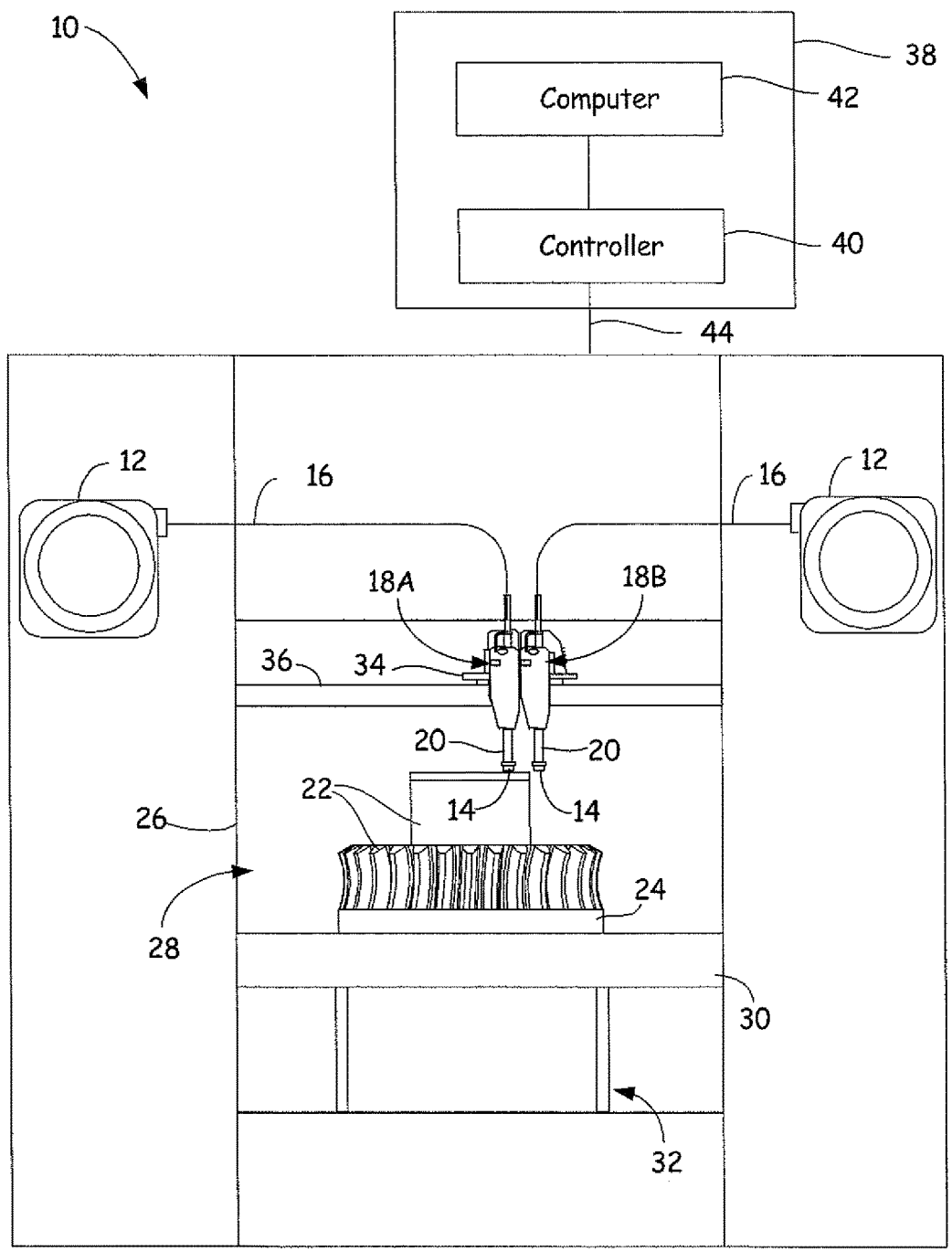
FIG. 1 is a schematic view of an 3D printer of the present disclosure.

The present disclosure may be used with any suitable extrusion-based 3D printer. For example, FIG. 1 illustrates a 3D printer 10 that has a substantially horizontal print plane where the part being printed in indexed in a substantially vertical direction as the part is printed in a layer by layer manner using two print heads 18A, 18B. The illustrated 3D printer 10 uses two consumable assemblies 12, where each consumable assembly 12 is an easily loadable, removable, and replaceable container device that retains a supply of a consumable filament for printing with system 10. Typically, one of the consumable assemblies 12 contains a part material filament, and the other consumable assembly 12 contains a support material filament, each supplying filament to one print head 18A or 18B. However, both consumable assemblies 12 may be identical in structure. Each consumable assembly 12 may retain the consumable filament on a wound spool, a spool-less coil, or other supply arrangement, such as discussed in Swanson et al., U.S. Pat. No. 8,403,658; Turley et al. U.S. Pat. No. 7,063,285; Taatjes at al., U.S. Pat. No. 7,938,356; and Mannella et al., U.S. Pat. Nos. 8,985,497 and 9,073,263.

Each print head 18A and 18B is an easily loadable, removable and replaceable device comprising a housing that retains a liquefier assembly 20 having a nozzle tip 14. Each print head 18A and 18B is configured to receive a consumable material, melt the material in liquefier assembly 20 to product a molten material, and deposit the molten material from a nozzle tip 14 of liquefier assembly 20. Examples of suitable liquefier assemblies for print head 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Patent Publications Nos. 2015/0096717 and 2015/0097053; and in PCT publication No. WO2016014543A.

Guide tube 16 interconnects consumable assembly 12 and print head 18A or 18B, where a drive mechanism of print head 18A or 18B (or of 3D printer 10) draws successive segments of the consumable filament from consumable assembly 12, through guide tube 16, to liquefier assembly 20 of print head 18A or 18B. In this embodiment, guide tube 16 may be a component of system 10, rather than a sub-component of consumable assemblies 12. In other embodiments, guide tube 16 is a sub-component of consumable assembly 12, and may be interchanged to and from system 10 with each consumable assembly 12. During a build operation, the successive segments of consumable filament that are driven into print head 18A or 18B are heated and melt in liquefier assembly 20. The melted material is extruded through nozzle tip 14 in a layerwise pattern to produce printed parts.

Exemplary 3D printer 10 prints parts or models and corresponding support structures (e.g., 3D part 22 and support structure 24) from the part and support material filaments, respectively, of consumable assemblies 12, using a layer-based, additive manufacturing technique. Suitable 3D printers 10 include fused deposition modeling systems developed by Stratasys, Inc., Eden Prairie, Minn. under the trademark "FDM".

As shown, the 3D printer 10 includes system casing 26, chamber 28, platen 30, platen gantry 32, head carriage 34, and head gantry 36. System casing 26 is a structural component of 3D printer 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of 3D printer 10. In these embodiments, consumable assembly 12 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18A and 18B, and is supported by head gantry 36. Head carriage 34 preferably retains each print head 18A and 18B in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., servoed, toggled, or otherwise switched in a pivoting manner). In further embodiments, print heads 18A and 18B and corresponding head carriage 34 may optionally be retrofitted into an existing system 10.

In the shown embodiment, head gantry 36 is a robotic mechanism configured to move head carriage 34 (and the retained print heads 18A and 18B) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18A and 18B) may be configured to move along the z-axis. Other similar arrangements may also be used such that one or both of platen 30 and print heads 18A and 18B are moveable relative to each other. Platen 30 and head carriage 34 (and print heads 18A and 18B) may also be oriented along different axes. For example, platen 30 may be oriented vertically and print heads 18A and 18B may print 3D part 22 and support structure 24 along the x-axis or the y-axis.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18A and 18B, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18A and 18B) around in the horizontal x-y plane above chamber 28. Controller assembly 38 may also direct print heads 18A and 18B to selectively draw successive segments of the consumable filaments from consumable assembly 12 and through guide tubes 16, respectively.

While, FIG. 1 illustrates a 3D printer 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1. Rather, the present disclosure including the coupling of the print head(s) 18A and 18B to head gantry 36 can be utilized with any 3D printer, including, but not limited to, printing in a substantially vertical print plane and moving the platen in a direction substantially normal to the substantially vertical print plane.

While FIG. 1 illustrates a 3D printer 10 that utilizes a build chamber 28 that can optionally be heated to a selected temperature, the present disclosure is not limited to an 3D printer with a heated chamber or a chamber. Rather, the present disclosure utilizing the retaining mechanism and the print head(s) 18A and 18B can be utilized with any 3D printer, including, but not limited to, 3D printers that utilize an unheated chamber or an out of oven 3D printer. Otherwise stated, the retaining mechanism utilized to secure the print head(s) 18A and 18B to the head gantry 36 can be utilized on any extrusion-based 3D printer.

Figure 2A:
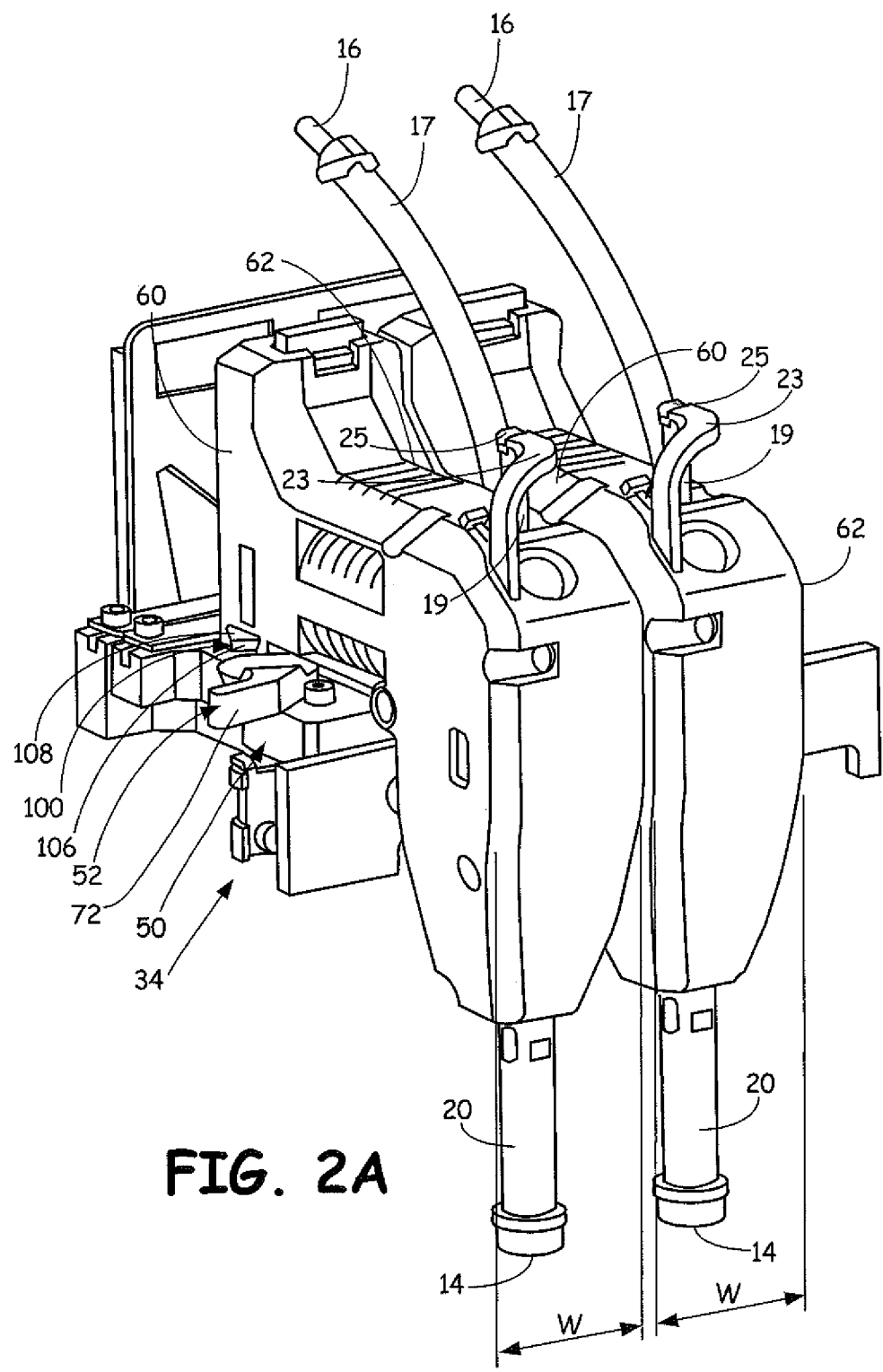
FIG. 2A is a first perspective view of a head carriage with two side by side print heads retained thereto.
Figure 2B:
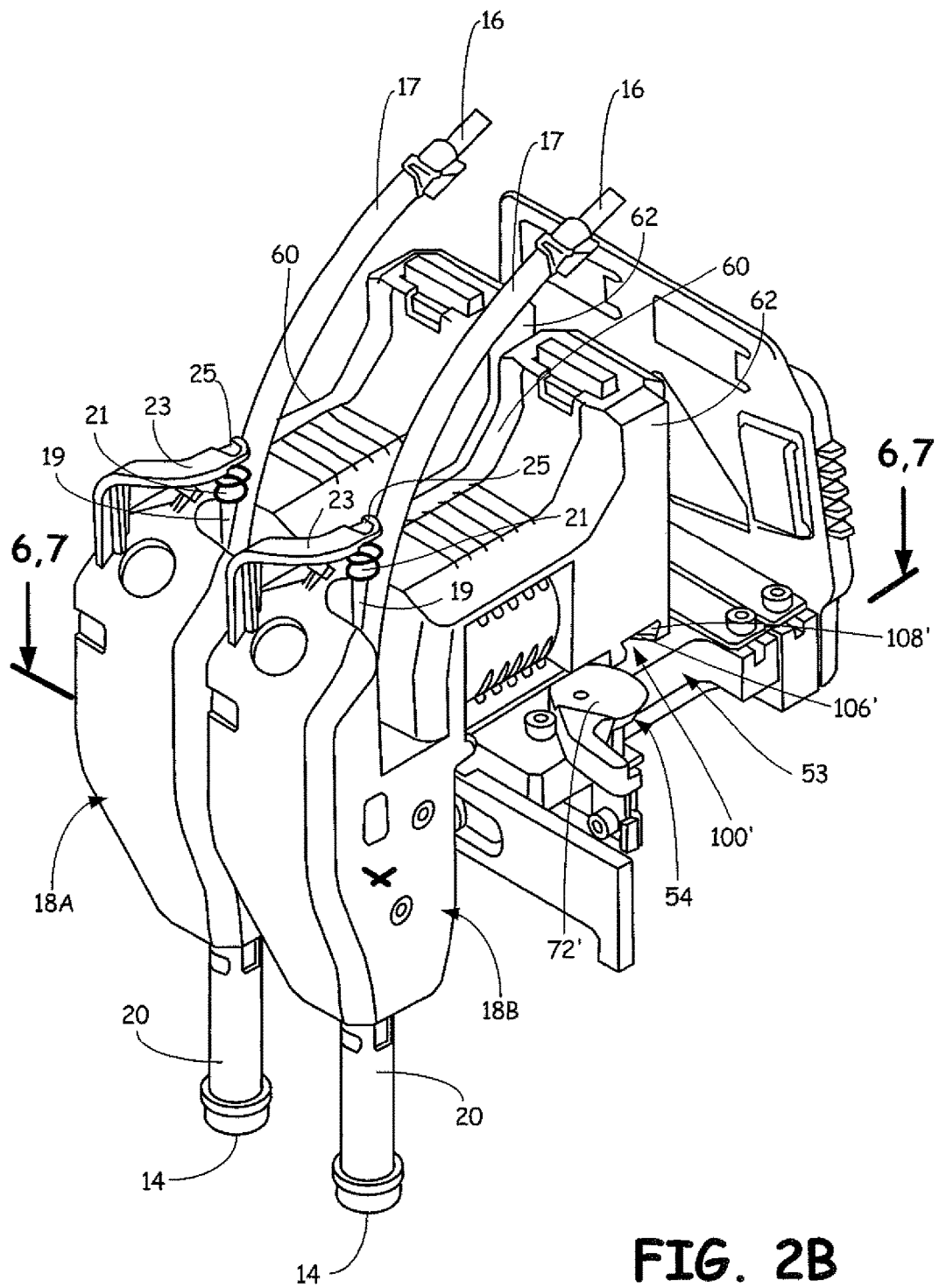
FIG. 2B is a second perspective view of the head carriage with the two side by side print heads retained thereto.
Figure 3:
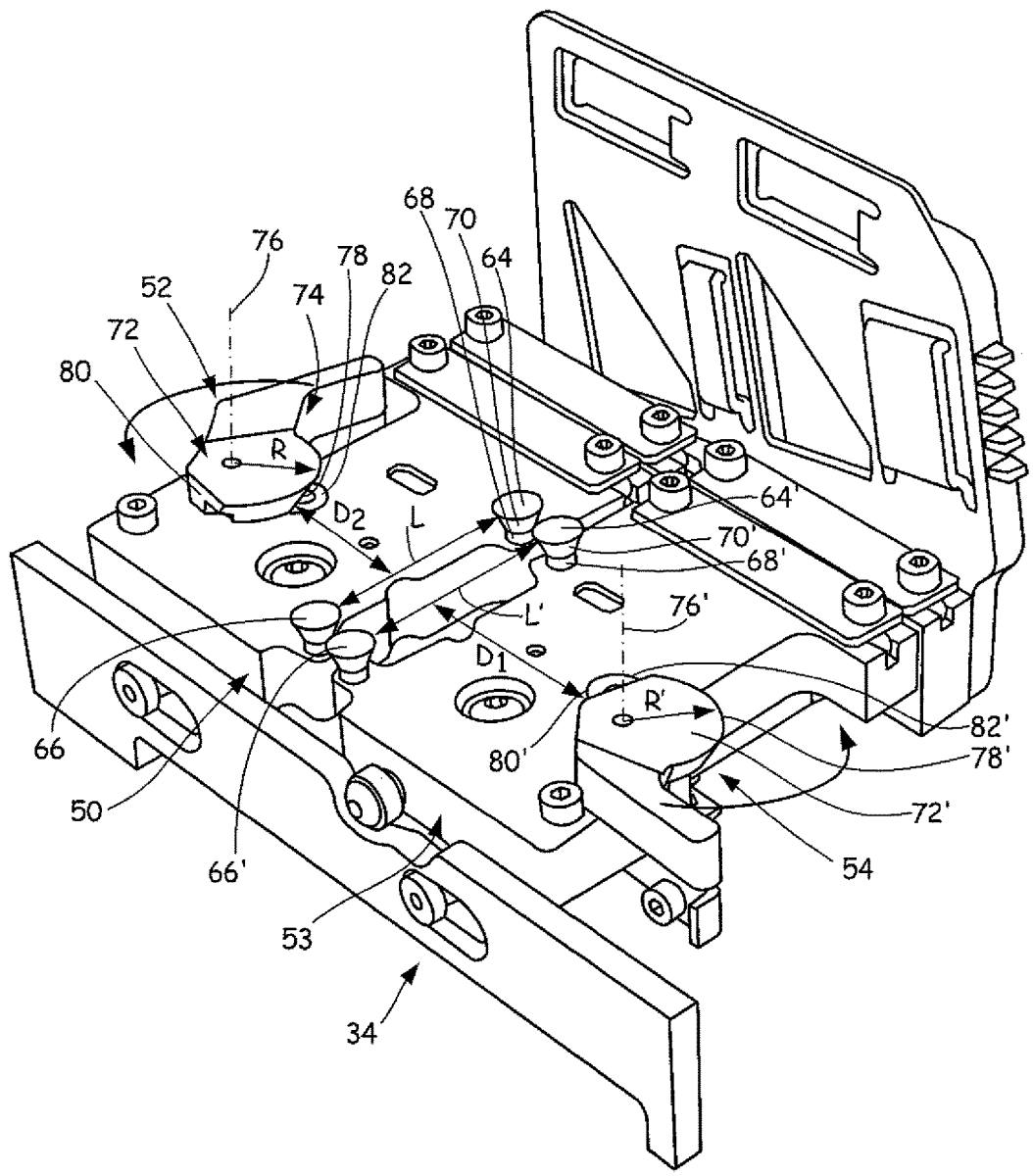
FIG. 3 is a perspective view of the head carriage.

Referring to FIGS. 2A, 2B and 3, the head carriage 34 of the present disclosure includes a left support member 50 having a left retaining mechanism 52 and a right support member 53 having a right retaining mechanism 54. The left support member 50 and left retaining mechanism 52 are substantially mirror images of the right support member 53 and the right retaining mechanism 54, respectively. Both print heads 18A and 18B including features on a left and right sides 60 and 62 that allow either print head 18A or 18B to be secured with either the left or right retaining mechanisms 52 or 54. Otherwise stated, the print heads 18A and 18B are configured to be retained to the head carriage 34 independent of the configuration of the retaining mechanism 52 or 54. As the left retaining mechanism 52 and the right retaining mechanism 54 are substantially mirror images of each other, the features of the left retaining mechanism 52 will be described in detail, while the mirror image features of the right retaining mechanism 54 will be assigned the same reference character with the prime (') designation.

The left retaining mechanism 52 includes a back pin 64 and a front pin 66 that are spaced apart from each other a selected distance and are non-movably retained to the left support member 50. The back pin 64 and the front pin 66 are substantially a same height above the left support member 50. The back and front pints 64 and 66 both include a substantially cylindrical portion 68 and a beveled portion 70 extending from the cylindrical portion 68. While spaced-apart pins are disclosed, the present disclosure can utilize one or more engaging members that are configured to engage the print head 18A or 18B.

The left retaining mechanism 52 includes a left camming mechanism 72 that is movably attached to the left support member 50 at a location between the back pin 64 and the front pin 66 and a distance offset from a line L between the back pin 64 and the front pin 66. The left camming mechanism 72 includes a camming member 74 that is rotatably secured to the left support member 50 such that the camming member 74 moves about an axis of rotation 76. The camming member 74 includes an arcuate camming surface 78 having an increasing radial distance from the axis of rotation 76 and a substantially flat surface 80, where the arcuate camming surface 78 is substantially the same height above the first support member 50 as the back pin 64 and the front pin 66.

The filament path includes an end piece 17 that attaches the guide tube 16 at one end and anther end engages the print head 18A or 18B. The end piece 17 is sufficiently rigid to retain an arcuate configuration having a radius that prevents the filament from bending too sharply which can cause the filament to break or create a crease in the filament that can result in the filament being misfed to the print head.

The end piece includes a connecting member 19 having a groove 21 around the circumference which engages a slot 25 in a retaining member 23 extending from the print head 18A or 18B. The engagement of the connecting member 19 with the retaining member 23 retains the end piece 17 and the guide tube 16 to the print head 18A or 18B while being moved with the head gantry 36. Further the connecting member 19 is removable from the retaining member 23 by disengaging the slot 25 from the groove 21 which allows the print head 18A or 18B to be quickly removed from the head carriage 34, and replaced as necessary.

The camming member 74 is positionable into a first, non-engaging position (as illustrated in FIG. 3 with the camming member 74') where a distance D1 between the substantially flat surface 80 and the line L between the back and front pins 64, 66 allows the print head 18A or 18B to be positioned therebetween as a width W of the print heads 18A and 18B is less than the distance D1. With the camming member 74 in the first, non-engaging position, a plunger 82 is biased upward with a compression spring 84 such that the plunger 82 extends above the left support member 50 a sufficient distance to engage the substantially flat surface 80 which prevents rotation of the camming member 74 from the first, non-engaging position to the second, engaging position.

The camming member 74 is positionable into a second, engaging position through rotation about the axis of rotation 76 where a radial distance R increases along the camming surface 78 which decreases to a distance D2 between the line L between the back and front pins 64, 66 and the camming surface 78 such that the print head 18A or 18B is secured to the head carriage 34 through a frictional engagement between the back and front pins 64, 66 and a sloped surface 79 of the camming surface 78.

Figure 4:
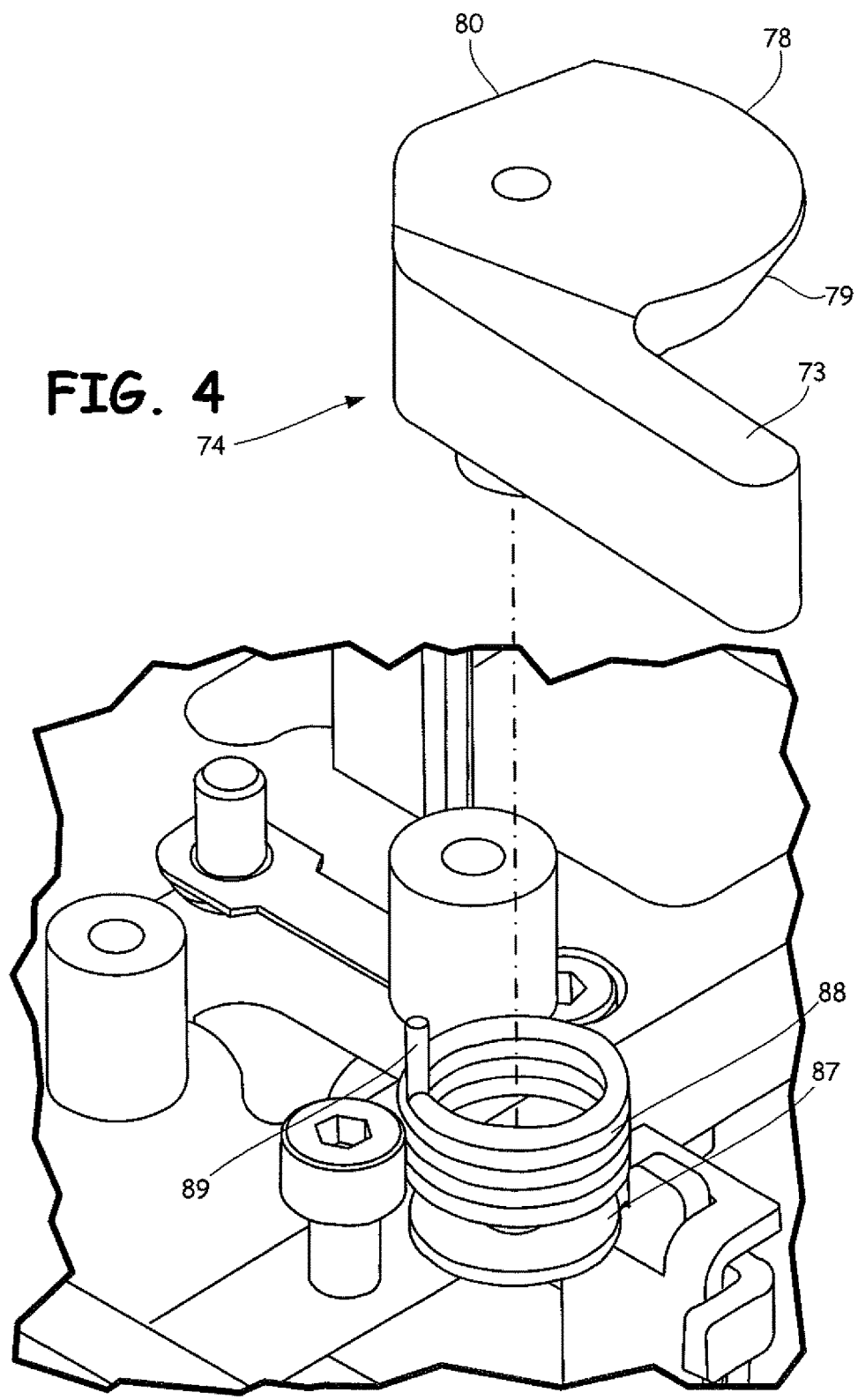
FIG. 4 is a partial exploded, cutaway view of a camming mechanism.
Figure 5:
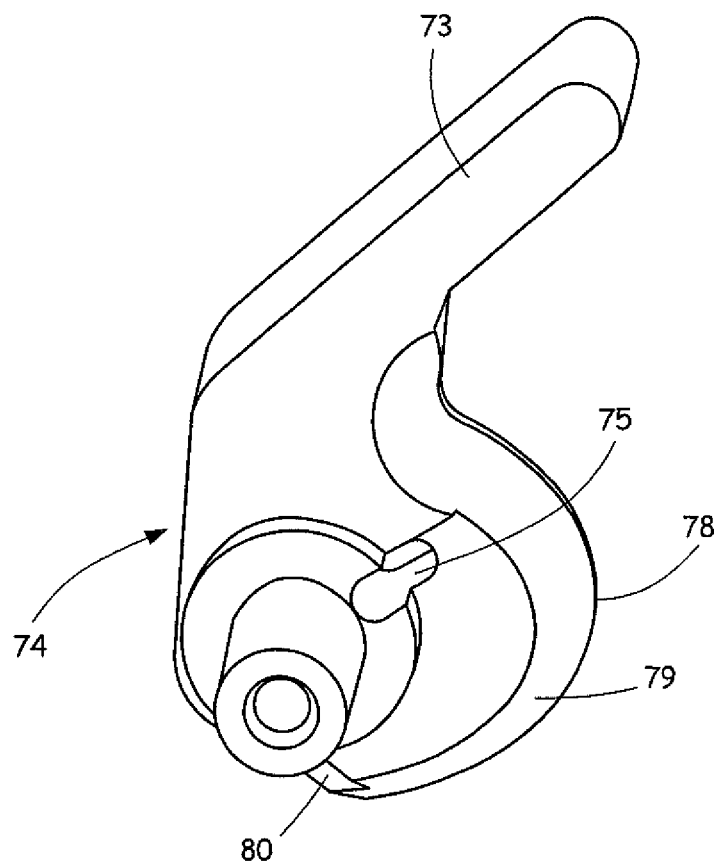
FIG. 5 is a perspective view of a camming member.

Referring to FIGS. 4 and 5, the camming member 74 is biased toward the second, engaging position with a torsion spring 88 having a first end 87 that engages the left support member 50 and a second end 89 that is positioned into a cavity 75 in the camming member 74. The camming member 74 is positioned into the first, non-engaging position by applying manual force to a handle 73 of the camming member 74 sufficient to overcome the spring force of the torsion spring 78 such that the flat surface 80 of the camming member 74 is displaced from the plunger 82 and the compression spring 84 biases the plunger 82 upward from the left support member 50. When manual force is released from the camming member 74, the substantially flat surface 80 engages the plunger 82 and prevent rotational movement of the camming member 74 towards the second, engaging position.

While a torsion spring and a compression spring are disclosed, other biasing mechanisms can be utilized. While a biased camming member 74 and a biased plunger 82 are disclosed, the present disclosure can utilize a manually operated camming mechanism that does not require a spring bias or a plunger to retain the camming member in the first, non-engaging position or the second, engaging position.

Figure 6:
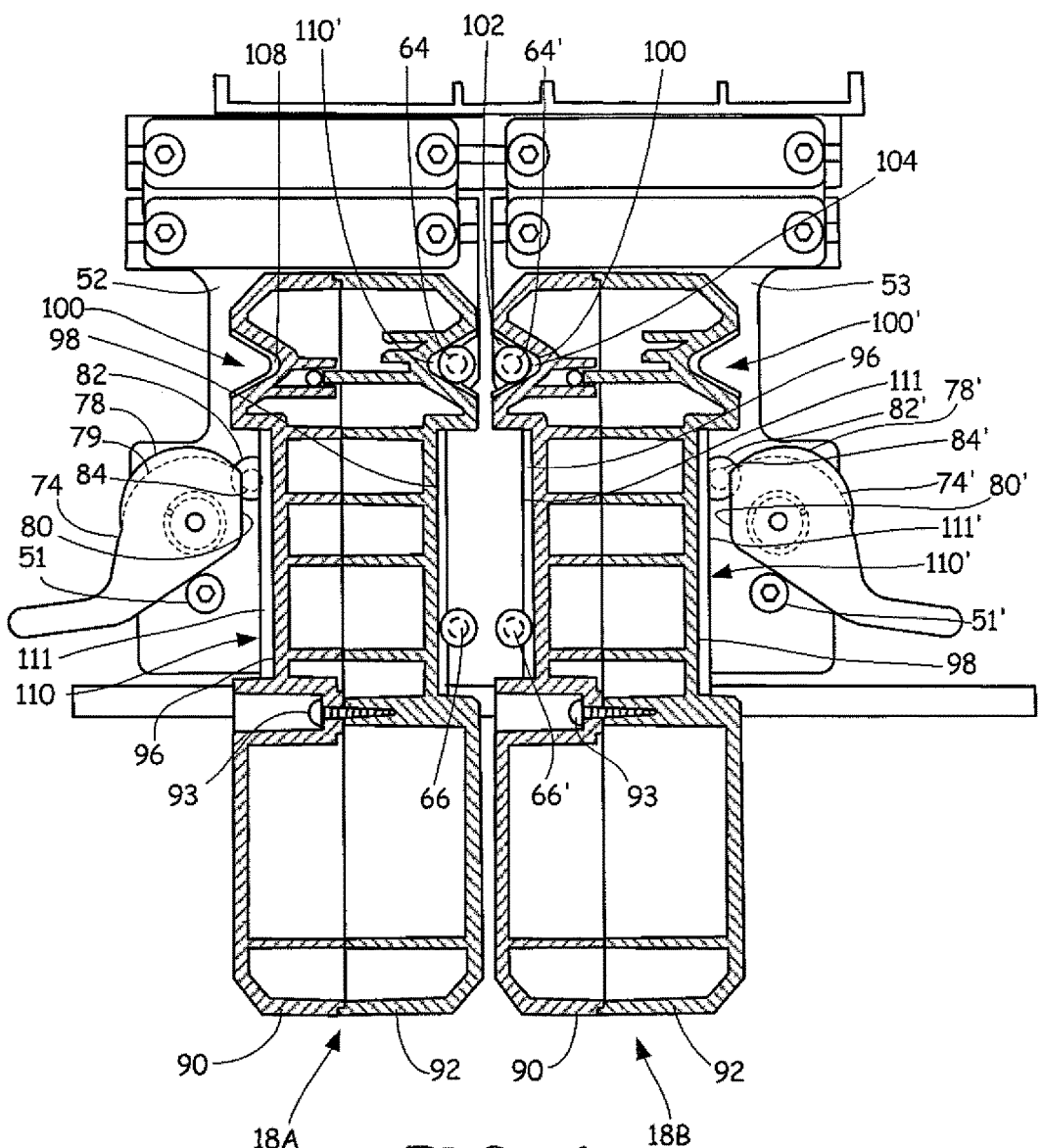
FIG. 6 is a sectional view taken in the plane 8, 9 in FIG. 2B where camming members are in a first, disengaging position.
Figure 7:
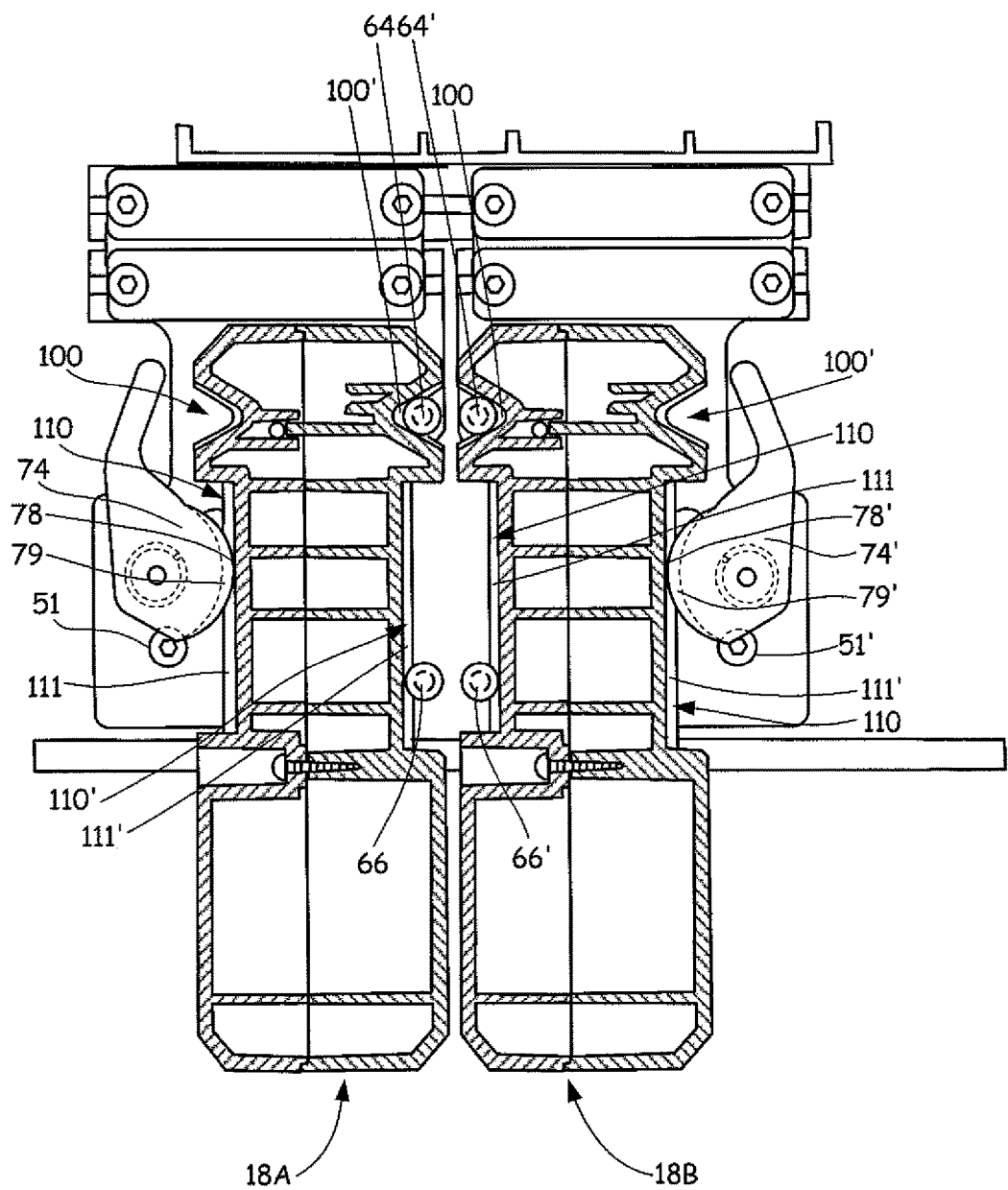
FIG. 7 is a sectional view taken in the plane 8, 9 in FIG. 2B where the camming members are in a second, engaging position.

Referring to FIGS. 6 and 7, the print heads 18A and 18B are similarly constructed. Both print heads 18A and 18B and retaining mechanisms 52 and 54 will be discussed herein to describe installation and removal of print heads 18A and 18B from head carriage 34.

The print heads 18A and 18B includes left and right housing portions 90 and 92 that are secured together with a screw 93. However, other securing mechanisms are within the scope of the present disclosure.

The left housing portion 90 includes a left side surface 96 and the right housing portion 92 has a right side surface 98, where the left and right side surfaces 96 and 98 include features configured to engage the front and back pins 64, 64' and 66, 66' and the camming surfaces 78, 78' of the camming members 74, 74' where the features are mirror images of each other such that the print head 18A or 18B can be utilized with either the left or right retaining mechanism 54, 56.

The left side surface 96 includes a print head locating member 100 that has a dovetail configured cavity with an opening 102 that tapers to a pin receiving portion 104 that is configured to engage the back pin 64. The receiving portion 104 includes a substantially flat vertical surface 106 and a slanted surface 108 wherein the substantially flat vertical surface 106 and the slanted surface 108 are configured to engage the substantially cylindrical portion 68 and the beveled portion 70 of the back pin 64 to restrict or substantially prevent movement of the print head 18A, 18B relative to the left support member 50 or the right support member 53. However, because the opening 102 is larger than a diameter of the back pin 64, the print head 18A or 18B can be non-precisely located on the left support member 50 and moved to a retaining position utilizing the dovetailed configuration to guide the print head 18A or 18B into the pin receiving portion 104 of the print head locating member 100.

The left side surface 96 includes a bottom channel 110 that includes a sloped surface 111 configured to engage the sloped surface 79 of the camming surface 78 when the camming member 74 is rotated to the second, engaging position. The right side surface 98 includes a bottom channel 110' that is the mirror image of the bottom channel 110. Similarly, the right side surface 98 includes a print head locating member 100' that is the mirror image of the print head locating member 100 in the left side surface 96.

To install the print head 18A, the camming member 74 is rotated to the first, non-engaging position with manual force such that the plunger 82 is biased upwardly from the left support member 50 with the compression spring 84, as illustrated in FIG. 6. The manual force is then released from the camming member 74 and the substantially flat surface 80 engages the plunger 82 to retain the camming member 74 in the first, non-engaging position. The print head 18A is positioned between the back and front pins 64 and 66 and the camming member 74 where the print head 18A is moved toward the back pin 64 such that the print head locating member 110' is positioned about the back pin 64 where further movement of the print head 18A causes the positioning of the print head 18A into a selected location on the left support member 50 due to the engagement of the print head locating member 110' with the back pin 64.

Downward movement of the print head 56 with manual force overcomes the bias of the compression spring 84, resulting in the plunger 82 being depressed into the left support member 50. With the plunger 82 depressed into the left support member 50, the torsion spring 88 forces the camming member 74 to rotate about the axis of rotation 76. As the camming member 74 rotates about the axis of rotation 76, the sloped surface 79 of the arcuate camming surface 78 engages the sloped surface 111 defining the channel 110 on the left side surface 96 resulting in the print head 18A moving towards the back and front pins 64 and 66 until the sloped surface 111' defining the channel 110' on the right side surface 98 engages the beveled surface of the front pin 66.

The torsion spring 88 continues to rotate the camming member 74 about the axis of rotation 76 until the radial distance between the axis of rotation 76 and the sloped camming surface 79 is sufficiently large to cause a frictional engagement of the print head 18A between the pins 64 and 66 and the sloped camming surface 79. The securing mechanism 52 having the pins 64,66 and the camming member 74 therefore prevents movement of the print head 18A relative to left support member 50 in the x, y and z directions as well as pitch, roll and yaw when the camming member 74 is in the second, engaging position as illustrated in FIG. 7.

To remove the print head 18A from the left support member 50, manual force is imparted onto the handle 73 of the camming member 74 and overcomes the bias of the torsion spring 88 such that the camming member 74 is rotated about the axis of rotation 76 until contacting a stop 51 extending upwardly from the left support member 50. When the handle 73 contacts the stop 51, the camming surface 78 is displaced from the plunger 82 such that the substantially flat surface 80 is proximate the plunger 82.

With the camming member 74 displaced from the plunger 82, the compression spring 84 imparts an upward force onto the plunger 82 and onto the print head 18A. The upward force at least partially displaces the print head 18A from the left support member 50 and allows the print head 18A to be removed from the left support member 50 with manual force. When manual force is released from the camming member 74, the torsion spring 88 imparts a force on the camming member 74 that results in the substantially flat surface 80 engaging the plunger 82 resulting in the movement of the camming member 74 being stopped.

With camming member 74 retained by the plunger 82, the next print head 18A can be quickly and easily mounted to the left support member 50 by locating the print head locating member 110' proximate the back pin 64 and depressing the plunger 82 with the print head 18A utilizing manual force. Depressing the plunger 82 allows the torsion spring 88 to rotate the camming member 74 about the axis of rotation such that the sloped scamming surface 79 engages the sloped surface 101 of the channel 100 resulting in a frictional engagement between the print head 18A with the back and front pins 64, 66 and the sloped camming surface 79 such that the print head 18A is retained to the left support member 50 in the x, y and z directions and pitch, roll and yaw.

As previously mentioned, the right support member 53 and the right retaining mechanism 54 are substantially mirror images of the left support member 50 and the left retaining mechanism 52. Similar components of the right retaining mechanism 54 have been given the same reference characters along with the prime designation as that of the left retaining mechanism 52. The pins 64' and 66' will engage the left side of the print head 56 and the camming mechanism 72' will engage the right side of the print head 56 and is biased to rotate in an opposite direction by the torsion spring 88' relative to the camming mechanism 72. Otherwise the right retaining mechanism 54 functions the same as the left retaining mechanism 52.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A 3D printer comprising:
  a gantry configured to move in a plane substantially parallel to a build plane;
  a platen configured to support a part being built in a layer by layer process, wherein the platen is configured to move in a direction substantially normal to the build plane;
  a head carriage carried by the gantry configured for receiving a removable print head on a first side surface thereof, wherein the head carriage comprises a first support member supporting a retaining mechanism, the retaining mechanism comprising:
    a plurality of members extending from the support member; and
    a camming member rotatably attached to the support member and movable about an axis of rotation, the camming member comprising an arcuate camming surface having an increasing radial distance from the axis of rotation; and
  wherein the camming member is positionable between a first, non-engaging position where a received print head is removable from the support member and a second, engaging position wherein the camming member engages a second side surface of the received print head and a first side surface of the received print head engages the at least one member and causes a frictional engagement therebetween;
wherein the print head is engaged to the head carriage via a horizontal force to the first and the second side surfaces of the print head using at least three non-linearly spaced points.

2. The 3D printer of claim 1 wherein the print head comprises a housing, the housing comprising:
the first side surface configured to engage the plurality of members; and the second
side surface configured to engage the arcuate camming surface.

3. The 3D printer of claim 1 and wherein the plurality of members comprises:
a back pin; and
a front pin spaced apart from the back pin.

4. The 3D printer of claim 3 and wherein the back pin and the front pin each comprises:
a bottom portion extending from the support member; and
a beveled portion having a sloped outer surface extending from the bottom portion.

5. The 3D printer of claim 1 and wherein the camming surface comprises a sloped surface from a top edge to a bottom edge wherein a first radial distance from the axis of rotation to the top edge is larger than a second radial distance from the axis of rotation to the bottom edge.

6. The 3D printer of claim 1 and wherein the camming mechanism further comprises a substantially flat outer surface.

7. The 3D printer of claim 1 and further comprising a first spring engaging the camming member wherein the first spring biases the camming member toward the second, engaging position.

8. The 3D printer of claim 1 and further comprising a plunger positionable between an extended position where the plunger extends from the support member and a depressed position where the plunger is positioned within the support member, wherein when in the extended position the plunger engages the camming member and retains the camming member in the first, non-engaging position and when the plunger is in the depressed position, the camming member is positionable into the second, engaging position.

9. The 3D printer of claim 8 and further comprising a second spring biasing the plunger into the extended position.

10. The 3D printer of claim 1 wherein the first side surface and the second side surface of the housing each comprises:
a cavity within a bottom surface configured to engage the back pin; and
a channel spaced from the cavity, the channel configured to engage the front pin and the arcuate camming surface wherein the cavity and the channel on the first side surface are substantially mirror images of the cavity and the channel on the second side surface.

11. The 3D printer of claim 10 and wherein the cavity comprises a dovetail shape within a bottom surface of the housing.

12. The 3D printer of claim 1 and further comprising:
an end piece having an arcuate filament path wherein the end piece is configured to removably engage the removable print head, and wherein the print head comprises a retaining member configured to removably engage the end piece.

13. A 3D printer comprising:
a gantry configured to move in a plane substantially parallel to a build plane;
a platen configured to support a part being built in a layer by layer process, wherein the platen is configured to move in a direction substantially normal to the build plane;
a head carriage carried by the gantry wherein the head carriage comprises a support member supporting a first retaining mechanism, the first retaining mechanism comprising:
a first pin extending from the support member;
a second pin extending from the support member and spaced from the first pin; and
a camming member rotatably attached to the support member between the first pin and the second pin at a location offset from both the first and second pins, the camming member movable about an axis of rotation, wherein the camming member comprising an arcuate camming surface having an increasing radial distance from the axis of rotation; and
at least one print head having a housing, the housing comprising:
a first side surface configured to engage the first pin and the second pin; and
a second side surface configured to engage the arcuate camming surface;
wherein the camming member is positionable between a first, non-engaging position where the at least one print head is removable from the support member and a second, engaging position wherein the camming member engages the second side of the print head and the first side of the print head engages the first and second pins and causes a frictional engagement therebetween;
wherein the print head is engaged to the head carriage via a horizontal force to the first and the second side surfaces of the print head using at least three non-linearly spaced points.

14. The 3D printer of claim 13 wherein heights of each of the first pin, the second pin and the camming surface from the support member are substantially the same.

15. The 3D printer of claim 13 and wherein the first pin and the second pin each comprises:
a bottom portion extending from the support member; and
a beveled portion having a sloped outer surface extending from the bottom portion.

16. The 3D printer of claim 13 and wherein the camming surface comprises a sloped surface from a top edge to a bottom edge wherein a first radial distance from the axis of rotation to the top edge is larger than a second radial distance from the axis of rotation to the bottom edge.

17. The 3D printer of claim 13 and wherein the camming mechanism further comprises a substantially flat outer surface.

18. The 3D printer of claim 13 and further comprising a spring engaging the camming member wherein the spring biases the camming member toward the second, engaging position.

19. The 3D printer of claim 13 and further comprising a plunger positionable between an extended position where the plunger extends from the support member and a depressed position where the plunger is positioned within the support member, wherein when in the extended position the plunger engages the camming member and retains the camming member in the first, non-engaging position and when the plunger is in the depressed position, the camming member is positionable into the second, engaging position.

20. The 3D printer of claim 13 wherein the first side surface and the second side surface of the housing each comprises:
- a cavity within a bottom surface configured to engage the first pin; and
- a channel spaced from the cavity, the channel configured to engage the second pin and the arcuate camming surface wherein the cavity and the channel on the first side surface are substantially mirror images of the cavity and the channel on the second side surface.

21. The 3D printer of claim 20 and wherein the channel on the first and second side surfaces comprises a sloped surface.

22. The 3D printer of claim 20 and wherein the cavity comprises a dovetail shape.

* * * * *